CHAIN SAW FOR CUTTING BRUSH AND SMALL TREES

Original Filed March 3, 1955 2 Sheets-Sheet 1

CHAIN SAW FOR CUTTING BRUSH AND SMALL TREES

Original Filed March 3, 1955 2 Sheets-Sheet 2

United States Patent Office

Re. 24,588
Reissued Jan. 13, 1959

24,588

CHAIN SAW FOR CUTTING BRUSH AND SMALL TREES

Joseph H. Budd, Pleasantville, N. Y., assignor, by mesne assignments, to Textron, Inc., a corporation of Rhode Island Original No. 2,797,717, dated July 2, 1957, Serial No. 491,930, March 3, 1955. Application for reissue August 15, 1958, Serial No. 755,365

3 Claims. (Cl. 143—32)

Matter enclosed in heavy brackets [ ] appears in the original patent but forms no part of this reissue specification; matter printed in italics indicates the additions made by reissue.

The present invention relates to portable chain saws and particularly improved chain guides for such saws.

A portable chain saw of the kind used for felling and cutting up trees and similar sawing operations comprises a power unit having a chain-driving sprocket, a chain guide mounted on the power unit adjacent the driving sprocket and projecting outwardly from said unit and a cutting chain running on the guide and driven by the sprocket. Chain guides presently available comprise three general types, namely (1) a "beaver tail" guide comprising an elongated, flat plate having approximately parallel sides and a rounded end; (2) a bow-type guide in which the cutting portion of the chain extends across the open side of a bow; and (3) a round or triangular type guide having a width approximately equal to, or greater than, its length. Saws with chain guides of these types are suitable for cutting down and cutting up trees of a size used for lumber, paper pulp, stove wood, etc. They are not suitable for clearing land covered with thick brush or small closely spaced trees.

Cutting brush presents problems quite different from cutting trees. Chain guides of saws designed for cutting trees have a relatively long cutting portion in order to accommodate trees of substantial size. However, in cutting brush, the cutting chain of such a saw would engage several stems at once. As they are limber and unsupported, the stems tend to bend over and thereby jam the saw, frequently breaking the chain. Moreover, it is desirable to cut brush close to the ground. With present saws, this can be accomplished only by the operator assuming a crouching or bending position which is extremely tiring.

It is an object of the present invention to provide a chain saw particularly suitable for cutting brush and small trees although it can also be used for larger trees. With the saw of the present invention, the difficulties referred to above are avoided. Brush, saplings and small trees can be cut rapidly and easily without jamming the saw and can be cut close to the ground without difficulty. The saw is also ideal for limbing and for bucking trees that are on the ground. These results are achieved by a novel chain guide of special shape and construction, as will be described below in conjunction with the accompanying drawings, in which:

Figure 7:
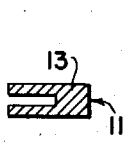
Figure 6:
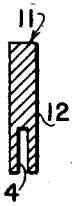
Figure 5:
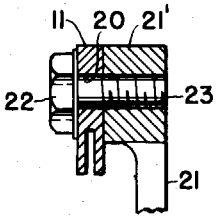
Figure 4:
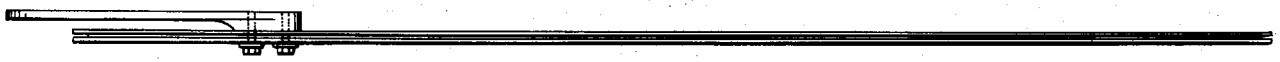
Fig. 4 is an edge view of the chain guide.
Figure 3:
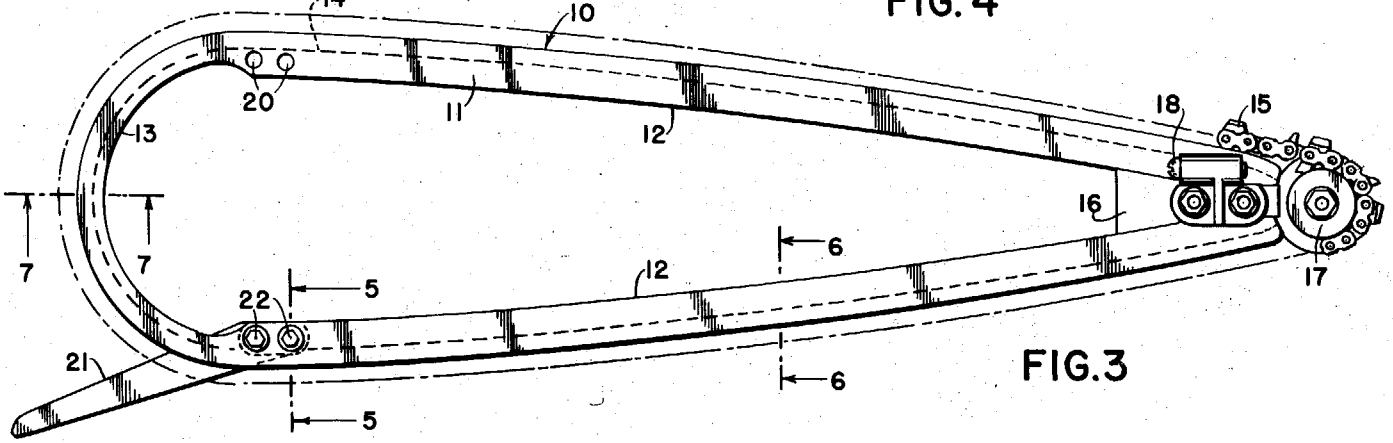
Fig. 3 is a plan of the chain guide.

Figs. 5, 6 and 7 are enlarged sections taken approximately on lines 5—5, 6—6 and 7—7, respectively, in Fig. 3.

The chain saw illustrated by way of example in the drawings comprises a power unit 1 which is shown as an internal combustion engine 2 having a fuel tank 3. A tubular front handle 4 is secured to the engine housing and extends around three sides of the unit, being braced by a strut 5. The unit is also provided with a rear handle 6 in the forward portion of which there is a trigger 7 which actuates the throttle or other control of the engine 2.

Figure 1:
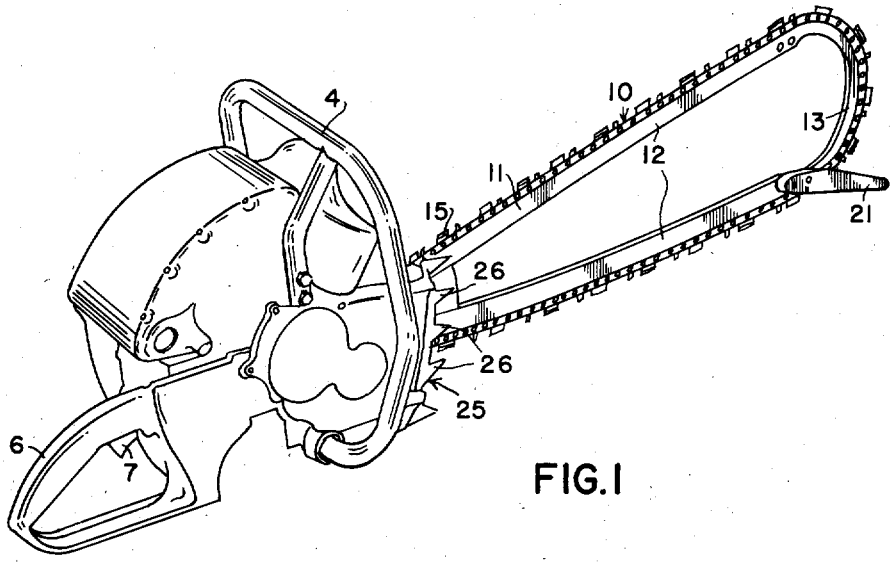
Fig. 1 is a perspective view of a chain saw in accordance with the invention.

A chain guide 10 *is* adjustably mounted on the power unit 1 adjacent one side of the unit, namely the side shown in Fig. 1. The chain comprises a flat guide bar 11 which is bent edgewise to provide two slightly curved substantially straight portions 12 connected at their outer ends by a semi-circular portion 13. In the outer periphery of the guide bar 11, there is provided a continuous groove or channel 14 for the cutting chain 15. The inner ends of the guide bar 11 are bolted, welded, or otherwise affixed, to a mounting plate 16 by means of which the chain guide is adjustably mounted on the power unit 1 adjacent a sprocket 17 (Fig. 3) for driving the chain. An adjusting screw 18 permits adjustment of the chain guide toward and away from the driving sprocket 17 to regulate the tension of the chain.

In accordance with the invention, the slightly curved portions 12 of the guide bar 11 diverge from one another at a relatively small angle, for example an angle of 10° to 15° and the circumferential extent of the semi-circular portion 13 is less than the length of each of the straight portions 12. In the embodiment of the invention shown in the drawings (Fig. 3), the angle between the slightly curved portions 12 of the guide bar 11 is approximately 12° and the circumferential extent of the semi-circular portion 13 is approximately half the length of each of the straight portions 12. The diameter of the semi-circular portion 13 is approximately ⅓—and hence the radius is approximately ⅙—of the length of each slightly curved portion of the guide bar. The chain guide is thus relatively long and narrow. Its overall length is more than three times its width at the outer ends of the slightly curved portions and the width of the chain guide decreases progressively in a direction toward the power unit. It will also be seen that the curved portion 13 of the bar is narrower than the slightly curved portions 12, its width being preferably ½ to ¾ that of the slightly curved portion. While the portions 12 of the guide bar are herein referred to as being slightly curved, they are actually shown slightly convex in order to assure that the cutting chain 15 stays in contact with the bar and runs smoothly. However, the radius of the portions 12 is quite large, for example 10 to 20 feet, being thus 25 to 50 times as long as the radius of the semi-circular portion 13. The curvature of the portions 12 is thus very slight.

At the outer end of each of the portions 12 of the guide bar 11, there is provided a pair of spaced holes 20 (Fig. 3). The holes 20 are just inside the bottom of the groove 14 in the guide bar and have their centers approximately in line with a continuation of the inner edge of the narrower semi-circular portion 13 of the bar. A work-engaging spur 21 is affixed to the guide bar 11 by means of two machine screws 22 extending through the holes 20 in the guide bar and screwed into tapped holes 23 in a thicker base portion 21' of the spur 21. The thickened base portion 21' not only provides greater area of thread engagement but also assures adequate clearance between the spur 21 and the cutting chain which has an effective cutting width greater than the thickness of the guide bar 11. The spur 21 projects outwardly beyond the outer end of the chain guide, being inclined outwardly and away from the longitudinal center line of the chain guide. Preferably, the angle of the spur 21 to the longitudinal center line of the chain guide is of the order of 15° to 30°. It will be seen that the chain guide is symmetrical about its longitudinal center line, even as to the provision of the holes 20 for mounting the spur 21. Hence, the chain guide is reversible and the spur 21 can be mounted on either side.

A further work-engaging member 25 having a plurality of relatively large teeth 26 is mounted on the power unit 1 adjacent the inner end of the chain guide 10. The teeth 26 are adapted to engage the work when cutting with the portion of the chain running on one of the slightly curved portions 12 of the guide bar 11.

Figure 2:
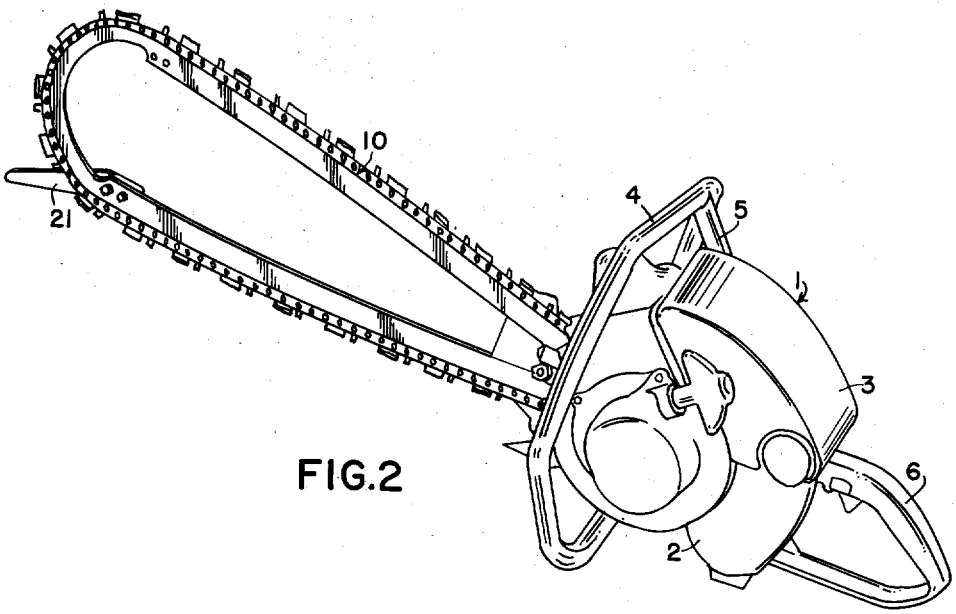
Fig. 2 is a perspective view of the chain saw as seen from the opposite side.

When used for cutting brush, the chain saw is held by the front handle 4 and the rear handle in a position with the side of the saw shown in Fig. 2 uppermost and hence with the side on which the chain guide is mounted nearest the ground. The longitudinal center line of the chain guide is inclined downwardly so that the outer tip of the chain guide is just above the ground while a transverse line lying in the plane of the chain guide is substantially horizontal. With the saw in this position, it is moved or jabbed forwardly in the direction of the longitudinal center line of the chain guide into engagement with the stems that are to be cut. As the curved end of the chain guide is of small diameter, it will engage only one stem or a small number of closely adjacent stems at a time. Engagement of the cutting chain with a stem causes the stem to come into engagement with the spur 21—if it is not already in engagement—and the chain thereupon quickly cuts through the stem. As will be seen in Fig. 3, the spur 21 and curved portion of the chain guide form a V-shaped fork and diverge at approximately equal angles from the center line of said fork. Small stems are readily trapped in this fork and quickly cut off. As the spur 21 projects outwardly beyond the semi-circular end of the chain guide, it will also engage larger tree trunks that are being cut by the portion of the chain running over the semicircular portion 13 of the guide bar. The chain guide is of such length and shape that, when the saw is held in the position described above, the operator can stand substantially upright with the saw held in a relaxed manner and yet be able to cut brush at ground level. The narrower curved portion 13 of the bar contributes to the free cutting properties of the saw and prevents binding of the guide when cutting small trees.

While the saw in accordance with the present invention is particularly effective in cutting brush, it can also be used for cutting down or cutting up large trees. In this event, the spur 21 is removed and the teeth 26 (Fig. 1) are engaged with the work and serve as a fulcrum to swing the cutter bar into, and through, the work.

While a preferred embodiment of the invention has been shown by way of example in the drawings and particularly described, it will be understood that the invention is in no way limited to this single embodiment.

What I claim and desire to secure by Letters Patent is:

1. In a chain saw, a power unit, a chain driving sprocket adjacent one side of said power unit and drivingly connected thereto, a chain guide mounted on said unit adjacent said sprocket and projecting forwardly from said unit in an approximately vertical plane when said unit is upright, a cutting chain running on said guide and having an upper and a lower run, said chain being driven by said sprocket, said power unit including means for driving said sprocket in a direction to cause the lower run of said chain to move toward said power unit, rear handle means at the rear of said power unit, front handle means at the front of said power unit and having a side portion at the side opposite said sprocket and top portion, said chain guide comprising a bar bent in an edgewise direction and having upper and lower slightly curved longitudinal portions diverging from said sprocket at an angle of approximately ten to fifteen degrees to one another and an approximately semicircular outer portion joining the outer ends of said longitudinal portions and having a diameter approximately one third the length of each of said longitudinal portions, said outer portion of said guide bar being narrower than said longitudinal portions, said guide being substantially symmetrical about a longitudinal center line bisecting said angle, and a spur removably mounted on the outer end of the lower longitudinal portion of said guide and forming an extension thereof, said spur projecting outwardly beyond said outer portion of the chain guide and downwardly at an acute angle of approximately twenty to thirty degrees to said center line in a position to engage work being cut by the portion of the chain running on said outer portion of said guide.

2. In a chain saw, a power unit, a chain driving sprocket adjacent the one side of said power unit and drivingly connected thereto, a chain guide mounted on said unit in the plane of said sprocket, a cutting chain running on said guide and driven by said sprocket, said chain having an outbound run moving away from said unit and an inbound run moving toward said unit, rear handle means at the rear of said unit, front handle means at the front of said power unit on the side opposite said sprocket, said saw being supportable by said handle means in a position with the sprocket side of said unit down and said chain guide projecting forwardly and downwardly in a plane inclined to horizontal, said chain guide comprising a bar bent in an edgewise direction and having two slightly curved longitudinal portions diverging from said sprocket at an angle of approximately ten to fifteen degrees to one another and an approximately semicircular outer portion joining the outer ends of said longitudinal portions and having a diameter approximately one third the length of said longitudinal portions, said longitudinal portions of the guide bar supporting said outbound and inbound runs of said chain, said outer portion of said guide bar being narrower than said longitudinal portions, said guide being substantially symmetrical about a longitudinal center line bisecting said angle and having a pair of spaced holes through the wider part of said guide bar adjacent the outer end of the longitudinal portion on which the inbound run of said chain is supported, a spur having a base portion and a projecting portion, said base portion having holes aligned with said holes in said guide bar, and fastening means in said aligned holes and securing said spur to said guide bar in such position that said projecting portion constitutes an extension of said longitudinal portion of the guide bar and projects outwardly beyond said outer portion of the chain guide and away from said center line at an acute angle to the adjacent part of said outer portion of the guide bar immediately outwardly of said spur in a position to receive work in the acute angle between said spur and said outer portion of said guide.

*3. In a chain saw, a power unit, a chain driving sprocket adjacent the one side of said power unit and drivingly connected thereto, a chain guide mounted on said unit adjacent said sprocket and projecting forwardly from said unit in the plane of said sprocket, a cutting chain running on said guide and driven by said sprocket, said chain having an outbound run moving away from said unit and an inbound run moving toward said unit, rear handle means at the rear of said unit, front handle means at the front of said power unit on the side opposite said sprocket, said saw being supportable by said handle means in a position with the sprocket side of said unit down and said chain guide projecting forwardly and downwardly in a plane inclined to horizontal, said chain guide comprising a bar curved in an edgewise direction and having two slightly curved longitudinal portions diverging from said sprocket at an angle of approximately ten to fifteen degrees to one another and an approximately semicircular outer portion joining the outer ends of said longitudinal portions and having a diameter approximately one third the length of said longitudinal portions, said longitudinal portions of the guide bar supporting said outbound and inbound runs of said chain, and a spur removably mounted on said guide bar adjacent the*

*outer end of the longitudinal portion on which the inbound run of said chain is supported, said spur projecting outwardly beyond said outer portion of the chain guide and laterally away from a longitudinal center line bisecting said angle between said longitudinal portions of said guide bar, said spur being thereby disposed at an acute angle to the adjacent part of said outer portion of the guide bar immediately outwardly of said spur in a position to receive work in the acute angle between said spur and said outer portion of said guide so as to be cut by said chain running on the outer portion of said guide, the outer portion of said guide bar being of reduced cross section so that work cut by the chain running on the outer portion of the guide bar does not bind on said outer portion of the guide bar.*

References Cited in the file of this patent or the original patent

UNITED STATES PATENTS

| | | |
|---|---|---|
| 1,891,105 | Meyer | Dec. 13, 1932 |
| 2,525,110 | Adair | Oct. 10, 1950 |
| 2,642,901 | Hayden | June 23, 1953 |
| 2,698,034 | Jabku | Dec. 28, 1954 |

FOREIGN PATENTS

| | | |
|---|---|---|
| 721,631 | Great Britain | Jan. 12, 1955 |

OTHER REFERENCES

Mall Tool Co. Circular, Models 1E and 1P Chain Saws, received in Patent Office Feb. 28, 1950. (Copy in Div. 29.)